US012803058B2

(12) United States Patent
Wu et al.

(10) Patent No.: US 12,803,058 B2
(45) Date of Patent: Nov. 17, 2026

(54) SECONDARY BATTERY AND PREPARATION METHOD THEREOF AND BATTERY MODULE, BATTERY PACK AND DEVICE COMPRISING THE SECONDARY BATTERY

(71) Applicant: CONTEMPORARY AMPEREX TECHNOLOGY (HONG KONG) LIMITED, Hong Kong (CN)

(72) Inventors: Yiyang Wu, Ningde City (CN); Baozhen Wu, Ningde City (CN); Yonghuang Ye, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 689 days.

(21) Appl. No.: 18/321,778

(22) Filed: May 23, 2023

(65) Prior Publication Data

US 2023/0327215 A1 Oct. 12, 2023

Related U.S. Application Data

(63) Continuation of application No. PCT/CN2020/141824, filed on Dec. 30, 2020.

(51) Int. Cl.
*H01M 4/525* (2010.01)
*H01M 4/583* (2010.01)
(Continued)

(52) U.S. Cl.
CPC ....... *H01M 10/0585* (2013.01); *H01M 4/525* (2013.01); *H01M 4/583* (2013.01);
(Continued)

(58) Field of Classification Search
CPC .... H01M 4/525; H01M 4/583; H01M 10/585; H01M 10/0525
See application file for complete search history.

(56) References Cited

U.S. PATENT DOCUMENTS

2015/0155557 A1* 6/2015 Kwon .................. H01M 4/587 264/604
2019/0097271 A1* 3/2019 Wang .................... H01M 4/667
2020/0313186 A1 10/2020 Wang et al.

FOREIGN PATENT DOCUMENTS

CN 203398216 U 1/2014
CN 108258193 A 7/2018
(Continued)

OTHER PUBLICATIONS

Machine Translation of: JP 2011-070976 A, Koga et al., Apr. 7, 2011.*
(Continued)

*Primary Examiner* — Kenneth J Douyette
(74) *Attorney, Agent, or Firm* — K&L Gates LLP

(57) ABSTRACT

A secondary battery and a preparation method thereof and a battery module, a battery pack and a device comprising the secondary battery are provided. The secondary battery comprises an electrode assembly, which comprises a main body part and a tab extending from the main body part, which comprises a negative electrode plate, and the negative electrode plate comprises a negative electrode current collector and a negative electrode film layer provided on at least one surface of the negative electrode current collector, wherein the negative electrode film layer comprises a first region and second regions provided on both sides of the first region in the extension direction of the tab, the first region comprises a first negative electrode active material, the first negative electrode active material comprising artificial graphite, and each of the second regions comprises a second negative electrode active material, the second negative electrode active material comprising graphite.

20 Claims, 4 Drawing Sheets

(51) Int. Cl.
*H01M 10/0525* (2010.01)
*H01M 10/0585* (2010.01)
*H01M 4/02* (2006.01)

(52) U.S. Cl.
CPC .. *H01M 10/0525* (2013.01); *H01M 2004/021* (2013.01); *H01M 2004/027* (2013.01); *H01M 2220/20* (2013.01)

(56) References Cited

FOREIGN PATENT DOCUMENTS

| | | | | |
|---|---|---|---|---|
| CN | 108807848 | A | | 11/2018 |
| CN | 109841831 | A | | 6/2019 |
| CN | 109980177 | A | | 7/2019 |
| CN | 110010902 | A | | 7/2019 |
| CN | 110112365 | A | | 8/2019 |
| CN | 110148706 | A | | 8/2019 |
| CN | 110212157 | A | | 9/2019 |
| CN | 111916668 | A | | 11/2020 |
| CN | 112086620 | A | | 12/2020 |
| EP | 3471175 | A2 | | 4/2019 |
| JP | 2005209411 | A | * | 8/2005 |
| JP | 2011070976 | A | | 4/2011 |
| JP | 2015210979 | A | | 11/2015 |
| JP | 2018106981 | A | | 7/2018 |
| WO | 2020141953 | A1 | | 7/2020 |

OTHER PUBLICATIONS

Machine Translation of: JP 2005-209411 A, Sato et al., Aug. 4, 2005.*
The extended European search report received in the corresponding European application 20967641.0, mailed Feb. 9, 2024.
International Search Report received in the corresponding International Application PCT/CN2020/141824, mailed Sep. 28, 2021.
Grant Notice received in the corresponding Chinese application 202080102139.0, mailed on Jul. 1, 2024.

* cited by examiner

SECONDARY BATTERY AND PREPARATION METHOD THEREOF AND BATTERY MODULE, BATTERY PACK AND DEVICE COMPRISING THE SECONDARY BATTERY

CROSS-REFERENCE TO RELATED APPLICATIONS

The present application is a continuation of International Application PCT/CN2020/141824, filed Dec. 30, 2020 and entitled "SECONDARY BATTERY AND PREPARATION METHOD THEREOF AND BATTERY MODULE, BATTERY PACK AND DEVICE COMPRISING THE SECONDARY BATTERY", which is incorporated herein by reference in its entirety.

TECHNICAL FIELD

The present application belongs to the technical field of secondary batteries, and in particular relates to a secondary battery and a preparation method thereof, and a battery module, a battery pack and a device comprising the secondary battery.

BACKGROUND ART

A secondary battery is reversibly charged and discharged mainly by means of the reciprocation of active ions between a positive electrode and a negative electrode. Existing secondary batteries already have a high energy density and a long cycle life as well as advantages such as no pollution and no memory effect, and thus are widely used in various consumer electronics and large devices such as electric vehicles and energy storage systems.

With the ever-increasing popularity of electric vehicles, users have higher requirements of mileage, and thus the secondary batteries are required to have a higher energy density. In pursuit of a high energy density, the design of a secondary battery usually employs a higher coating weight and a higher compacted density. However, this makes the secondary battery prone to a rapid decline in capacity during a long-term use, thereby intensifying the user's anxiety in endurance mileage.

Therefore, it is still necessary to provide a secondary battery capable of having both a high energy density and a long cycle life.

SUMMARY OF THE INVENTION

An objective of the present application is to provide a secondary battery capable of having both a high energy density and a long cycle life, and a preparation method thereof.

Another objective of the present invention is to provide a battery module, a battery pack and a device comprising at least one secondary battery according to the present invention.

In order to achieve the above objectives, a first aspect of the present application provides a secondary battery, comprising an electrode assembly, the electrode assembly comprising a main body part and a tab extending from the main body part, the main body part comprising a negative electrode plate, and the negative electrode plate comprising a negative electrode current collector and a negative electrode film layer provided on at least one surface of the negative electrode current collector, wherein the negative electrode film layer comprises a first region and second regions provided on both sides of the first region in the extension direction of the tab, the first region comprises a first negative electrode active material, the first negative electrode active material comprising artificial graphite, and each of the second regions comprises a second negative electrode active material, the second negative electrode active material comprising graphite; and when the direct-current impedance of a part of the negative electrode plate corresponding to the first region is marked as $R_1$, and the direct-current impedance of a part of the negative electrode plate corresponding to the second regions is marked as $R_2$, then the second battery satisfies that: $R_1<R_2$.

In the secondary battery provided by the present application, by using artificial graphite in a middle region of the negative electrode film layer in the extension direction of the tab and graphite on both side regions, it is beneficial for the secondary battery to have a high energy density as well as a low expansion during cycling. Moreover, when the direct-current impedance of the part of the negative electrode plate corresponding to the first region is less than that of the part corresponding to the second regions, each region of the negative electrode film layer is enabled to have a high lithium-intercalation dynamic performance. Therefore, the secondary battery of the present application can be improved in cycle life on the premise of having a high energy density. Further, the secondary battery can also have a high fast-charging ability.

In any embodiment of the present application, $0.65\leq R_1/R_2\leq 0.95$; and optionally, $0.8\leq R_1/R_2\leq 0.9$. When the ratio of the direct-current impedance of the part of the negative electrode plate corresponding to the first region to the direct-current impedance of the part corresponding to the second regions is appropriate, the cycle life and fast-charging ability of the second battery can be further improved.

In any embodiment of the present application, when the dimension of the first region in the extension direction of the tab is marked as $L_1$, and a sum of the dimensions of the two second regions on both sides of the first region in the extension direction of the tab is marked as $L_2$, then the secondary battery satisfies that: $L_1\geq L_2$. Optionally, $1\leq L_1/L_2\leq 9$. Further optionally, $1\leq L_1/L_2\leq 4$. When the proportion of the first region of the negative electrode film layer is appropriate, a long cycle life, a high fast-charging ability and a high energy density of the secondary battery can be better balanced.

In any embodiment of the present application, the two second regions provided on both sides of the first region have the same dimension in the extension direction of the tab. When the negative electrode film layer satisfies the above conditions, the active-ion transport performance of each region of the negative electrode film layer can be further improved, thereby further improving the cycle life and fast-charging ability of the battery.

In any embodiment of the present application, the powder compacted density of the first negative electrode active material under a pressure of 25 kN is less than that of the second negative electrode active material under a pressure of 25 kN. Under the same pressure condition, since the first negative electrode active material has a lower powder compacted density than the second negative electrode active material, the infiltration uniformity in return of an electrolyte solution can be enhanced, so that the lithium-intercalation dynamic performance of the negative electrode plate is improved, thereby further improving the cycle life, fast-charging ability and safety performance of the battery.

In any embodiment of the present application, a ratio of the powder compacted density of the first negative electrode active material under a pressure of 25 kN to the powder compacted density of the second negative electrode active material under a pressure of 25 kN is 0.6 to 1, and optionally 0.7 to 0.9. When the ratio is in an appropriate range, the battery is enabled to obtain a long cycle life and a high fast-charging ability as well as a high energy density.

In any embodiment of the present application, the powder compacted density of the first negative electrode active material under a pressure of 25 kN is 1.1 g/cm$^3$ to 1.9 g/cm$^3$, optionally 1.4 g/cm$^3$ to 1.7 g/cm$^3$, and further optionally 1.5 g/cm$^3$ to 1.65 g/cm$^3$. When the powder compacted density of the first negative electrode active material is in an appropriate range, it is beneficial for the secondary battery to have a long cycle life, a high fast-charging ability and a high energy density simultaneously.

In any embodiment of the present application, the powder compacted density of the second negative electrode active material under a pressure of 25 kN is 1.5 g/cm$^3$ to 2.0 g/cm$^3$, optionally 1.65 g/cm$^3$ to 1.9 g/cm$^3$, and further optionally 1.7 g/cm$^3$ to 1.85 g/cm$^3$. When the powder compacted density of the second negative electrode active material is in an appropriate range, the energy density of the secondary battery can be improved.

In any embodiment of the present application, when the OI value of the part of the negative electrode plate corresponding to the first region is marked as $V_1$, and the OI value of the part of the negative electrode plate corresponding to the second regions is marked as $V_2$, then the $V_1$ and $V_2$ can satisfy that: $V_1<V_2$. When the negative electrode plate satisfies the above conditions, the ability of the electrolyte solution to diffuse from both ends toward the middle region can be enhanced so that the electrolyte solution has a good infiltration uniformity on the negative electrode film layer, thereby improving the cycle life, fast-charging ability and safety performance of the battery.

In any embodiment of the present application, the $V_1$ and $V_2$ can satisfy that: $0.25 \leq V_1/V_2 \leq 0.95$; and optionally, $0.4 \leq V_1/V_2 \leq 0.9$. When the negative electrode plate satisfies that $V_1/V_2$ is in an appropriate range, the cycle life and fast-charging ability of the battery can be further improved.

In any embodiment of the present application, the OI value of the part of the negative electrode plate corresponding to the first region is 10 to 40, and optionally 10 to 30. When the $V_1$ of the negative electrode plate is in an appropriate range, the battery is enabled to obtain high cycle performance and fast-charging ability.

In any embodiment of the present application, the OI value of the part of the negative electrode plate corresponding to the second regions is 20 to 50, and optionally 30 to 40. When the $V_2$ of the negative electrode plate is in an appropriate range, it is helpful in improving the energy density of the battery.

In any embodiment of the present application, the volume-average particle size $D_v50$ of the first negative electrode active material is 6 μm to 18 μm, and optionally 8 μm to 15 μm.

In any embodiment of the present application, the number proportion of primary particles in the first negative electrode active material is ≥60%, and the volume-average particle size $D_v50$ of the first negative electrode active material is 9 μm to 12 μm.

In any embodiment of the present application, the number proportion of secondary particles in the first negative electrode active material is ≥60%, and the volume-average particle size $D_v50$ of the first negative electrode active material is 12 μm to 15 μm.

When $D_v50$ of the first negative electrode active material is in an appropriate range, the cycle life and fast-charging ability of the battery can be improved.

In any embodiment of the present application, the volume-average particle size $D_v50$ of the second negative electrode active material is 10 μm to 22 μm, and optionally 15 μm to 20 μm. When the $D_v50$ of the second negative electrode active material is appropriately large, it is beneficial in improving the energy density of the battery.

In any embodiment of the present application, the tap density of the first negative electrode active material is 0.85 g/cm$^3$ to 1.3 g/cm$^3$, and optionally 0.85 g/cm$^3$ to 1.0 g/cm$^3$.

When the tap density of the first negative electrode active material is in an appropriate range, it is helpful in improving the cycle life of the battery, and the energy density of the battery can also be improved.

In any embodiment of the present application, the tap density of the second negative electrode active material is 0.95 g/cm$^3$ to 1.5 g/cm$^3$, optionally 1.0 g/cm$^3$ to 1.4 g/cm$^3$, and further optionally 1.0 g/cm$^3$ to 1.2 g/cm$^3$. When the tap density of the second negative electrode active material is in an appropriate range, both the cycle life and energy density of the battery can be improved.

In any embodiment of the present application, the gram capacity of the first negative electrode active material is 330 mAh/g to 380 mAh/g, and optionally 340 mAh/g to 360 mAh/g. When the gram capacity of the first negative electrode active material is in an appropriate range, the battery is enabled to obtain a high energy density, and the cycle life and fast-charging ability of the battery can also be improved.

In any embodiment of the present application, the gram capacity of the second negative electrode active material is 350 mAh/g to 380 mAh/g, and optionally 355 mAh/g to 370 mAh/g. When the gram capacity of the second negative electrode active material is in an appropriate range, the battery is enabled to obtain a high energy density.

In any embodiment of the present application, the first negative electrode active material further optionally comprises natural graphite. When the first negative electrode active material contains an appropriate amount of natural graphite, the energy density of the battery can be further improved.

In any embodiment of the present application, the second negative electrode active material comprises one or more of artificial graphite and natural graphite. By using the second negative electrode active material, the battery is enabled to obtain a high energy density as well as a long cycle life and a high fast-charging ability.

In any embodiment of the present application, the surface density of the negative electrode film layer is 0.03 mg/mm$^2$ to 0.16 mg/mm$^2$, and optionally 0.06 mg/mm$^2$ to 0.12 mg/mm$^2$. When the surface density of the negative electrode film layer is within the above range, the battery is enabled to obtain a high energy density, a high fast-charging ability and a long cycle life.

In any embodiment of the present application, the compacted density of the negative electrode film layer is 1.2 g/cm$^3$ to 2.0 g/cm$^3$, and optionally 1.4 g/cm$^3$ to 1.8 g/cm$^3$. When the compacted density of the negative electrode film layer is within the given range, it is helpful for the battery to obtain high energy density, fast-charging ability and cycle performance.

In any embodiment of the present application, the maximum dimension of the main body part in the extension direction of the tab is ≥60 mm, optionally 70 mm to 300 mm, and further optionally 80 mm to 150 mm. The secondary battery of the present application can have a great height, which is helpful in improving the energy density of the battery.

In any embodiment of the present application, the maximum dimension of the main body part in a direction perpendicularly intersecting with the extension direction of the tab is ≥60 mm, optionally 70 mm to 300 mm, and further optionally 100 mm to 250 mm. The secondary battery of the present application can have a great width, which is helpful in improving the energy density of the battery.

In any embodiment of the present application, the main body part comprises a positive electrode plate, the positive electrode plate comprises a positive electrode current collector and a positive electrode film layer provided on at least one surface of the positive electrode current collector and comprising a positive electrode active material, and the positive electrode active material comprises one or more of lithium transition metal oxides, lithium-containing phosphates with an olivine structure and respective modified compounds thereof. Optionally, the positive electrode active material comprises one or more of lithium transition metal oxides shown by a formula 1 and modified compounds thereof, $$Li_aNi_bCo_cM_dO_eA_f \quad \text{formula 1,}$$

in which formula 1, $0.8 \leq a \leq 1.2$, $0.5 \leq b < 1$, $0 < c < 1$, $0 < d < 1$, $1 \leq e \leq 2$, and $0 \leq f \leq 1$, M is selected from one or more of Mn, Al, Zr, Zn, Cu, Cr, Mg, Fe, V, Ti and B, and A is selected from one or more of N, F, S and Cl. By using the positive electrode active material layer, the battery is enabled to obtain a high energy density.

A second aspect of the present application provides a method for preparing a secondary battery, the secondary battery comprising an electrode assembly, the electrode assembly comprising a main body part and a tab extending from the main body part, the main body part comprising a negative electrode plate, wherein the method comprises preparing a negative electrode plate of the secondary battery by the following steps: providing a first negative electrode slurry comprising a first negative electrode active material and a second negative electrode slurry comprising a second negative electrode active material, the first negative electrode active material comprising artificial graphite, and the second negative electrode active material comprising graphite; providing a negative electrode current collector, at least one surface of the negative electrode current collector comprising a first coating area and second coating areas respectively provided on both sides of the first coating area in the extension direction of the tab; and applying the first negative electrode slurry to the first coating area of the negative electrode current collector, and applying the second negative electrode slurry to the second coating areas of the negative electrode current collector, to form a negative electrode film layer, thereby obtaining a negative electrode plate; wherein the negative electrode film layer comprises a first region and second regions provided on both sides of the first region in the extension direction of the tab, and when the direct-current impedance of a part of the negative electrode plate corresponding to the first region is marked as $R_1$, and the direct-current impedance of a part of the negative electrode plate corresponding to the second regions is marked as $R_2$, then $R_1 < R_2$.

In the method for preparing a secondary battery provided by the present application, by using artificial graphite in a middle region of the negative electrode film layer in the extension direction of the tab and graphite on both side regions and making the negative electrode plate satisfy $R_1 < R_2$, the secondary battery using same can be improved in cycle life on the premise of having a high energy density. Further, the secondary battery can also have a high fast-charging ability.

A third aspect of the present application provides a battery module, comprising at least one secondary battery according to the present application.

A fourth aspect of the present application provides a battery pack, comprising at least one secondary battery according to the present application and/or at least one battery module according to the present application.

A fifth aspect of the present application provides a device, comprising at least one of a secondary battery, a battery module or a battery pack according to the present application.

The battery module, the battery pack and the device of the present application comprise the secondary battery of the present application, and thus advantageous effects corresponding to the secondary battery can be obtained.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without any creative effort.

DETAILED DESCRIPTION OF EMBODIMENTS

Figure 1:
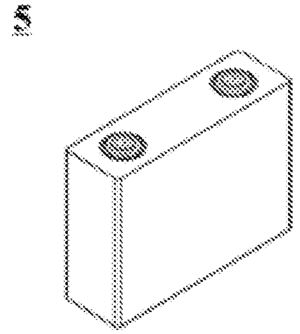
FIG. 1 is a schematic diagram of an embodiment of a secondary battery of the present application.

In order to make the objectives, technical solutions and beneficial technical effects of the present application clearer, the present application will be further described in detail below in conjunction with embodiments. It should be understood that the embodiments described in this specification are only for explaining the present application, instead of intending to limit the present application.

For the sake of brevity, merely some numerical ranges are explicitly disclosed herein. However, any lower limit may be combined with any upper limit to form a range that is not explicitly specified; and any lower limit may be combined with any other lower limit to form a range that is not explicitly specified, and any upper limit likewise may be combined with any other upper limit to form a range that is not explicitly specified. Further, although not explicitly specified, each point or single value between endpoints of a range is included in the range. Thus, each point or single value can be taken as a lower or upper limit to be combined with any other point or single value or with any other lower or upper limit to form a range that is not explicitly specified.

In the description herein, it should be noted that, unless otherwise stated, "no less than" and "no more than" means the endpoints preceded by them being included, and "more" in the phrase "one or more" means two or more.

The above summary of the present application is not intended to describe every disclosed embodiment or every implementation of the present application. The following description will illustrate exemplary embodiments in more detail. Throughout the present application, teachings are provided by means of a number of embodiments, which can be used in various combinations. In each instance, a list is only a representative group and should not be interpreted as exhaustive.

A secondary battery, also known as a rechargeable battery or an accumulator, refers to a battery of which active substances can be activated by means of charging for reuse of the battery after the battery is discharged.

Typically, a secondary battery comprises an electrode assembly and an electrolyte solution. The electrode assembly comprises a main body part and a tab extending from the main body part. The main body part may comprise a positive electrode plate, a negative electrode plate and a separator, and is usually a laminated structure formed by the positive electrode plate, the negative electrode plate and the separator by a lamination process, or a wound structure formed by a winding process. The separator is provided between the positive electrode plate and the negative electrode plate, and mainly prevents the positive and negative electrodes from short-circuiting and enables ions to pass through. The tab comprises a positive electrode tab extending from the edge of the positive electrode plate and a negative electrode tab extending from the edge of the negative electrode plate. The positive electrode tab and the negative electrode tab may extend from the same side of the main body part, or may extend from two opposite sides of the main body part.

During a charge/discharge process of the battery, active ions (e.g., lithium ions) are intercalated and de-intercalated back and forth between the positive electrode plate and the negative electrode plate. The electrolyte solution is infiltrated in the main body part and mainly functions for ionic conduction between the positive electrode plate and the negative electrode plate. The positive electrode tab and the negative electrode tab can further be electrically connected to corresponding electrode terminals (which can be provided on a top cover assembly of an outer package of the battery) by means of an adapter piece, so as to extract the electric energy of the main body part.

Since the negative electrode active material undergoes significant changes in interlayer spacing during the deintercalation and intercalation processes of active ions, in a charge process of the secondary battery, the negative electrode active material expands to squeeze the pore structures of the negative electrode film layer to squeeze out the electrolyte solution. In a discharge process, the negative electrode active material shrinks so that pores in the negative electrode film layer are re-increased and the electrolyte solution flows back to the negative electrode film layer. This phenomenon is called a "breathing effect" of the film layer. However, since it takes some time for the electrolyte solution squeezed out of the film layer to return to the pores of the film layer, and also local pore structures may be blocked, poor local infiltration of the film layer is likely to occur. Infiltration non-uniformity of the electrolyte solution degrades the active-ion conduction performance, thereby leading to a short cycle life of the secondary battery.

The "breathing effect" affects the batteries with a high energy density more severely. In particular, the negative electrode film layer in the middle region of a large-size battery (e.g., with a height or a width of ≥60 mm) has greater volume expansion effect and stress, and thus the "breathing effect" is more obvious. Therefore, the battery is more prone to degradation of the active-ion conduction performance in the middle region during a cycle process. Even in a charge process of the battery, active ions are easily released from the surface of the negative electrode film layer in the middle region, which further exacerbates expansion and irreversible thickness increase and causes a vicious circle, thereby finally leading to a quick "decline" in the battery cycle. In addition, the release of active ions easily produces dendritic crystals, and there is a risk of the dendritic crystals piercing the separator to cause short circuiting in the battery, thereby affecting the safety performance of the battery.

The large-size battery generally means that the maximum dimension of the main body part of the electrode assembly in the extension direction of the tab is ≥60 mm, and the maximum dimension in a direction perpendicularly intersecting with the extension direction of the tab is ≥60 mm. The middle region of the battery generally refers to a middle region on a large face of the battery.

Through numerous studies, the inventors have found that by optimizing the design of the negative electrode film layer, it can be effectively ensured that the entire negative electrode film layer including the middle region of the battery has a good active-ion diffusion performance, so that the secondary battery has a high energy density as well as a long cycle life.

[Negative Electrode Plate]

The negative electrode plate comprises a negative electrode current collector and a negative electrode film layer provided on at least one surface of the negative electrode current collector, wherein the negative electrode film layer comprises a first region and second regions provided on both sides of the first region in the extension direction of the tab, the first region comprises a first negative electrode active material, the first negative electrode active material comprising artificial graphite, and each of the second regions comprises a second negative electrode active material, the second negative electrode active material comprising graphite; and when the direct-current impedance of a part (hereinafter referred to as the first part) of the negative electrode plate corresponding to the first region is marked as $R_1$, and the direct-current impedance of a part (hereinafter referred to as the second part) of the negative electrode plate corresponding to the second regions is marked as $R_2$, then the second battery satisfies that: $R_1<R_2$.

By using artificial graphite in a middle region of the negative electrode film layer in the extension direction of the tab and graphite on both side regions, it is beneficial for the secondary battery to have a high energy density as well as a low expansion during cycling. Moreover, since the direct-current impedance of the first part of the negative electrode plate is less than that of the second part, each region of the negative electrode film layer is enabled to have a high lithium-intercalation dynamic performance, and thus it is ensured that active ions can be diffused quickly in the entire negative electrode film layer, thereby effectively prolonging the cycle life of the secondary battery. Furthermore, the fast-charging ability of the secondary battery can also be improved.

The negative electrode film layer having a good overall active-ion diffusion performance can reduce a polarization phenomenon and also the release of active ions from the surface of the film layer, such that the cycle life and fast-charging ability of the battery can be further improved, and it is beneficial for the battery to obtain a high safety performance. In addition, since the first part of the negative electrode plate has lower direct-current impedance than the second part, the utilization rate of the negative electrode active material can be increased in the middle-late period of the battery cycle, so as to sufficiently receive active ions from the positive electrode and improve the capacity retention rate during cycling.

In some embodiments, $0.65 \le R_1/R_2 \le 0.95$. Optionally, $0.7 \le R_1/R_2 \le 0.9$, $0.75 \le R_1/R_2 \le 0.85$, $0.8 \le R_1/R_2 \le 0.92$, $0.8 \le R_1/R_2 \le 0.9$, or $0.8 \le R_1/R_2 \le 0.87$. When the ratio of the direct-current impedance of the first part of the negative electrode plate to the direct-current impedance of the second part is appropriate, the cycle life and fast-charging ability of the second battery can be further improved.

In the present application, the secondary battery can be made to satisfy $R_1 < R_2$ by adjusting the particle size distribution (e.g., $D_v50$) and powder compacted density of the first negative electrode active material and the second negative electrode active material, the OI values of the first part and the second part of the negative electrode plate, etc.

The powder compacted density $D_1$ of the first negative electrode active material under a pressure of 25 kN may be less than or equal to the powder compacted density $D_2$ of the second negative electrode active material under a pressure of 25 kN. Optionally, $D_1/D_2$ is 0.6 to 1. In some embodiments, $D_1 < D_2$. Under the same pressure condition, since the first negative electrode active material has lower powder compacted density than the second negative electrode active material, a greater porosity and a better pore-channel structure maintaining ability can be formed in the first region of the negative electrode film layer than in the second regions. Since a gradient pore distribution is formed from the second regions to the first region of the negative electrode film layer, a driving force for the electrolyte solution to diffuse from both ends toward the first region via the second regions can be enhanced, thereby effectively alleviating the problem of poor infiltration of the electrolyte solution in the film layer in the middle region of the battery (including a secondary battery with a large structural size), and improving the infiltration uniformity in the return of the electrolyte solution. Therefore, different regions of the negative electrode film layer all can maintain a good lithium-intercalation reaction interface in the cycle process of the battery, so that the lithium-intercalation dynamic performance of the negative electrode plate is improved, thereby further improving the cycle life, fast-charging ability and safety performance of the battery.

In some embodiments, $D_1/D_2$ is 0.6 to 0.95. Optionally, $D_1/D_2$ is 0.6 to 0.8, 0.7 to 0.9, 0.7 to 0.85, 0.8 to 0.95, 0.8 to 0.9, 0.82 to 0.88 or 0.83 to 0.9, etc. When $D_1/D_2$ is in an appropriate range, a better gradient pore distribution can be formed on the negative electrode film layer, the distribution uniformity for infiltration in the return of the electrolyte solution is further improved, and the negative electrode active material of the negative electrode film layer is enabled to have a high volume proportion. Therefore, the battery can obtain a long cycle life and a high fast-charging ability as well as a high energy density.

In some embodiments, the powder compacted density $D_1$ of the first negative electrode active material under a pressure of 25 kN is 1.1 g/cm$^3$ to 1.9 g/cm$^3$; and optionally 1.3 g/cm$^3$ to 1.9 g/cm$^3$, 1.3 g/cm$^3$ to 1.8 g/cm$^3$, 1.4 g/cm$^3$ to 1.7 g/cm$^3$, 1.45 g/cm$^3$ to 1.6 g/cm$^3$, 1.5 g/cm$^3$ to 1.65 g/cm$^3$, or 1.55 g/cm$^3$ to 1.65 g/cm$^3$. When the powder compacted density of the first negative electrode active material is in an appropriate range, a great porosity and a high pore-channel structure maintaining ability can be formed in the first region of the negative electrode film layer, and also the negative electrode film layer is enabled to have a high compacted density, so that the secondary battery is enabled to have a long cycle life, a high fast-charging ability and a high energy density simultaneously.

In some embodiments, the powder compacted density $D_2$ of the second negative electrode active material under a pressure of 25 kN is 1.5 g/cm$^3$ to 2.0 g/cm$^3$; and optionally 1.6 g/cm$^3$ to 1.9 g/cm$^3$, 1.65 g/cm$^3$ to 1.9 g/cm$^3$, 1.7 g/cm$^3$ to 1.85 g/cm$^3$, 1.8 g/cm$^3$ to 1.9 g/cm$^3$, or 1.75 g/cm$^3$ to 1.85 g/cm$^3$. When the powder compacted density of the second negative electrode active material is in an appropriate range, a high gram capacity can be obtained, and thus the energy density of the secondary battery can be improved.

In some embodiments, when the OI value of the first part of the negative electrode plate is marked as $V_1$, and the OI value of the second part of the negative electrode plate is marked as $V_2$, then $V_1 < V_2$. The OI value of the negative electrode plate can characterize a degree of isotropy for lithium intercalation of the particles of the negative electrode active material in the negative electrode film layer. The smaller the OI value, the higher the degree of isotropy for lithium intercalation of the particles of the negative electrode active material, which enables the expansion produced by the lithium intercalation to be dispersed in all directions, thereby reducing the expansion during cycling of the negative electrode plate. In the negative electrode plate of the present application, the OI value of the first part is less than that of the second part, and thus the first region of the negative electrode film layer has a lower expansion during cycling than the second regions. Since the first region of the negative electrode film layer has a high pore-channel structure maintaining ability and the gradient pore distribution from the second regions to the first region of the negative electrode film layer can also be improved, such that the ability of the electrolyte solution to diffuse from both ends toward the middle region can be enhanced, the electrolyte solution can be made to have a good infiltration uniformity on the negative electrode film layer, thereby improving the cycle life, fast-charging ability and safety performance of the battery.

In addition, the smaller OI value of the first part of the negative electrode plate means that the orientation of the particles of the negative electrode active material in the first region of the negative electrode film layer is more beneficial for the intercalation of active ions, and thus a high fast-lithium-intercalation ability can be obtained. Therefore, the negative electrode plate can quickly receive active ions from the positive electrode, to further improve the fast-charging ability of the battery.

In some embodiments, the $V_1$ and $V_2$ can satisfy that $0.25 \le V_1/V_2 \le 0.95$. Optionally, $0.25 \le V_1/V_2 \le 0.8$, $0.3 \le V_1/V_2 \le 0.7$, $0.5 \le V_1/V_2 \le 0.7$, $0.4 \le V_1/V_2 \le 0.9$, $0.5 \le V_1/V_2 \le 0.8$, $0.6 \le V_1/V_2 \le 0.85$, $0.65 \le V_1/V_2 \le 0.8$, or $0.6 \le V_1/V_2 \le 0.75$. When the ratio of the OI values of the first part and the second part of the negative electrode plate is in an appropriate range, the infiltration uniformity of the electrolyte solution of the negative electrode plate can be better improved, thereby further improving the cycle life and fast-charging ability of the battery.

In some embodiments, the OI value $V_1$ of the first part of the negative electrode plate is 10 to 40, and optionally 10 to 35, 10 to 30, 10 to 20, 15 to 25, 20 to 35, 20 to 28, or 22 to 26, etc. When the $V_1$ of the negative electrode plate is in an appropriate range, the negative electrode active material in the first region has a low direction selectivity in a lithium intercalation process, and the lithium-intercalation expansion can be dispersed in all directions, thereby further reducing the volumetric expansion of the first part of the negative electrode plate and improving the infiltration performance of the electrolyte solution. Moreover, the part of the negative electrode plate corresponding to the first region can also obtain a high active-ion diffusion ability. In addition, when the $V_1$ of the negative electrode plate is in an appropriate range, it can also ensure a good bonding property between the negative electrode active material in the first region and the negative electrode current collector, to prevent film peeling and powder dropping. Therefore, a battery using the negative electrode plate can obtain high cycle performance and fast-charging ability.

In some embodiments, the OI value $V_2$ of the second part of the negative electrode plate is 20 to 50, and optionally 20 to 30, 30 to 40, 25 to 35, or 30 to 35, etc. When the $V_2$ of the negative electrode plate is in an appropriate range, it is helpful in improving the energy density of the battery.

In some embodiments, the volume-average particle size $D_v50$ of the first negative electrode active material is 6 μm to 18 μm; and optionally 8 μm to 15 μm, 8 μm to 12 μm, or 9 μm to 13 μm. When the $D_v50$ of the first negative electrode active material is in an appropriate range, a high gram capacity can be obtained while the particles are enabled to have a short ion transport path, and it is ensured that a smooth pore-channel structure is formed between the particles, to facilitate the infiltration and return of the electrolyte solution. Therefore, the first part of the negative electrode plate can obtain a high active-ion migration performance, thereby improving the cycle life and fast-charging ability of the battery. In addition, when the first negative electrode active material has an appropriately great $D_v50$, the side-reaction activity during contact between the particles and the electrolyte solution can be reduced, thereby further improving the cycle life of the battery.

In some embodiments, the number proportion of primary particles in the first negative electrode active material is ≤60%, and the volume-average particle size $D_v50$ of the first negative electrode active material is 9 μm to 12 μm; and optionally 9.5 μm to 11 μm. When the first negative electrode active material satisfies the above conditions, a smooth pore-channel structure can be formed between the particles, and the particles have a short ion transport path, which is beneficial for the first part of the negative electrode plate to have a suitable direct-current impedance, thereby enabling the battery to obtain a long cycle life and a high fast-charging ability.

In some other embodiments, the number proportion of secondary particles in the first negative electrode active material is ≥60%, and the volume-average particle size $D_v50$ of the first negative electrode active material is 12 μm to 15 μm; and optionally 12 μm to 14 μm, or 13 μm to 15 μm. When the first negative electrode active material satisfies the above conditions, it not only enables the first part of the negative electrode plate to have a high active-ion migration performance as well as a high gram capacity, but also causes few side reactions of the electrolyte solution on the surface of the particles, thereby enabling the battery to have a long cycle life, a high fast-charging ability and a high energy density.

The primary particles and the secondary particles both have the meanings that are well known in the art. A primary particle refers to a particle in a non-agglomerated state. A secondary particle refers to a particle in an agglomerated particle formed by the aggregation of two or more primary particles. The primary particles and the secondary particles can be easily distinguished by SEM images taken by a scanning electron microscope.

In some embodiments, the volume-average particle size $D_v50$ of the second negative electrode active material is 10 μm to 22 μm; and optionally 10 μm to 17 μm, 12 μm to 17 μm, 15 μm to 20 μm, 15 μm to 17 μm, 14 μm to 16.5 μm, or 13 μm to 19 μm. When the $D_v50$ of the second negative electrode active material is appropriately large, it is beneficial in improving the energy density of the battery.

In some embodiments, the tap density of the first negative electrode active material is 0.85 $g/cm^3$ to 1.3 $g/cm^3$, and optionally 0.9 $g/cm^3$ to 1.15 $g/cm^3$, or 0.85 $g/cm^3$ to 1.0 $g/cm^3$. When the tap density of the first negative electrode active material is in an appropriate range, the fast-lithium-intercalation ability of the battery can be improved, which is helpful in improving the cycle life of the battery. And also, by using the first negative electrode active material, the energy density of the battery can also be improved.

In some embodiments, the tap density of the second negative electrode active material is 0.95 $g/cm^3$ to 1.5 $g/cm^3$, and optionally 1.0 $g/cm^3$ to 1.4 $g/cm^3$, 1.0 $g/cm^3$ to 1.3 $g/cm^3$, or 1.0 $g/cm^3$ to 1.2 $g/cm^3$. When the tap density of the second negative electrode active material is in an appropriate range, the fast-lithium-intercalation ability, cycle life and energy density of the battery can be improved simultaneously.

In some embodiments, the gram capacity of the first negative electrode active material is 330 mAh/g to 380 mAh/g, and optionally 340 mAh/g to 360 mAh/g, 345 to 355 mAh/g, or 350 to 360 mAh/g. When the gram capacity of the first negative electrode active material is high, the energy density of the battery can be improved. When the gram capacity of the first negative electrode active material is in an appropriate range, it can also be ensured that the particles have a short active-ion migration path, to enhance the ion diffusion ability of the first part of the negative electrode plate, thereby improving the cycle life and fast-charging ability of the battery and also alleviating the safety risk of the battery caused by lithium release on the negative electrode.

In some embodiments, the gram capacity of the second negative electrode active material is 350 mAh/g to 380 mAh/g, and optionally 350 mAh/g to 365 mAh/g, or 355 mAh/g to 370 mAh/g. When the gram capacity of the second negative electrode active material is high, the energy density of the battery can be improved.

In some embodiments, the mass proportion of the artificial graphite in the first negative electrode active material is 60% or more, and optionally 60% to 100%, 80% to 100%, 80% to 95%, 80% to 90%, 85% to 97%, or 90% to 100%. Since the first negative electrode active material contains much artificial graphite, it is beneficial for the first part of the negative electrode plate to obtain a high reversible capacity as well as a low expansion during cycling and a high pore-channel structure maintaining ability, thereby helping to improve the energy density, fast-charging ability and cycle life of the battery.

In some embodiments, the first negative electrode active material also optionally comprises other active materials that can be used for a negative electrode of a secondary battery. Examples of the other active materials may include natural graphite, silicon-based materials, tin-based materials, etc.

In some embodiments, the first negative electrode active material also comprises natural graphite. Optionally, the mass proportion of the natural graphite in the first negative electrode active material is 40% or less; and further optionally 5% to 30%, 10% to 25%, or 10% to 20%. When the first negative electrode active material contains an appropriate amount of natural graphite, the lithium-intercalation dynamic performance of the first part of the negative electrode plate and also the energy density of the battery can be improved.

In some embodiments, the graphite of the second negative electrode active material may include one or more of artificial graphite and natural graphite.

In some embodiments, the total mass proportion of the artificial graphite and natural graphite in the second negative electrode active material may be 70% to 100%, and optionally 80% to 100%, 85% to 95%, or 90% to 100%. Further, a mass ratio of the artificial graphite to the natural graphite in the second negative electrode active material may be (100 to 0):(0 to 100); and further optionally (100 to 60):(0 to 40), or (95 to 70):(5 to 30).

In the negative electrode plate of the present application, in addition to the negative electrode active material, the first region and the second region of the negative electrode film layer usually also optionally comprises a binder, a conductive agent and/or an auxiliary agent. Examples of the conductive agent may include one or more of superconducting carbon, carbon black (e.g., acetylene black, Ketjen black), carbon dots, carbon nanotubes, graphene, and carbon nanofibers. Examples of the binder may include one or more of a butadiene styrene rubber (SBR), a water-soluble unsaturated resin SR-1B, a water-based acrylic resin, polyvinyl alcohol (PVA), sodium alginate (SA) and carboxymethyl chitosan (CMCS). Examples of the auxiliary agent may include a thickening agent (e.g., sodium carboxymethyl cellulose CMC-Na) and the like.

In some embodiments, when the dimension of the first region of the negative electrode film layer in the extension direction of the tab is marked as $L_1$, and a sum of the dimensions of the two second regions on both sides of the first region in the extension direction of the tab is marked as $L_2$, then the secondary battery satisfies $0.1 \le L_1/L_2 \le 10$. Optionally, $0.25 \le L_1/L_2 \le 9$, $0.4 \le L_1/L_2 \le 7$, or $0.5\ L_1/L_2 \le 5$. Further optionally, $L_1 \ge L_2$. Still further optionally, $1 \le L_1/L_2 \le 9$, $1 \le L_1/L_2 \le 6$, $1 \le L_1/L_2 \le 4$, $1 \le L_1/L_2 \le 2.5$, $1.5 \le L_1/L_2 \le 3$, $1.5L_1/L_2 \le 2.5$, or $1.2 \le L_1/L_2 \le 2$, etc.

When the proportion of the first region of the negative electrode film layer is appropriate, the overall active-ion migration performance of the negative electrode film layer can be effectively improved, and also it is beneficial for the negative electrode film layer to have a high reversible capacity, so that a long cycle life, a high fast-charging ability and a high energy density of the secondary battery can be better balanced.

In the negative electrode plate of the present application, in the extension direction of the tab, the dimensions of the two second regions on both sides of the first region of the negative electrode film layer may be the same or different. In some embodiments, the two second regions provided on both sides of the first region have the same dimension in the extension direction of the tab. As such, different regions of the negative electrode film layer have a good consistency in the infiltration performance of the electrolyte solution, and the active-ion transport performance of each region of the negative electrode film layer can be further improved, so as to further enhance the cycle life and fast-charging ability of the battery.

In some embodiments, the surface density of the negative electrode film layer is 0.03 $mg/mm^2$ to 0.16 $mg/mm^2$, and optionally 0.06 $mg/mm^2$ to 0.12 $mg/mm^2$. In the present application, the surface density of the negative electrode film layer means the overall surface density of the negative electrode film layer, namely, the total weight of the first region of the negative electrode film layer and the two second regions on both sides of the first region divided by the total area of the first region of the negative electrode film layer and the two second regions on both sides of the first region. When the surface density of the negative electrode film layer is within the above range, the negative electrode plate is enabled to have a high capacity and a high active-ion diffusion ability, so that the battery obtains a high energy density, a high fast-charging ability and a long cycle life.

In some embodiments, the compacted density of the negative electrode film layer is 1.2 $g/cm^3$ to 2.0 $g/cm^3$, and optionally 1.4 $g/cm^3$ to 1.8 $g/cm^3$. In the present application, the compacted density of the negative electrode film layer means the overall compacted density of the negative electrode film layer, namely, a ratio of the surface density to the thickness of the negative electrode film layer. When the compacted density of the negative electrode film layer is within the given range, the negative electrode plate is enabled to have a high reversible capacity as well as a low expansion during cycling and a good lithium-intercalation dynamic performance, which is helpful for the battery to have high energy density, fast-charging ability and cycle performance.

The negative electrode current collector may be a metal foil or a composite current collector (a composite current collector can be formed by providing a metal material on a polymer substrate). As an example, the negative electrode current collector may be a copper foil.

In the negative electrode plate of the present application, the negative electrode film layer may be provided on one side of the negative electrode current collector, or may be provided on both sides of the negative electrode current collector.

Figure 6:
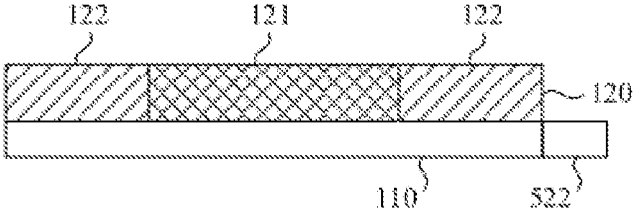
FIG. 6 is a schematic cross-section diagram of an embodiment of a negative electrode plate of the present application.

FIG. 6 schematically shows a sectional view of a negative electrode plate as an example. The negative electrode plate comprises a negative electrode current collector 110 and a negative electrode film layer 120 provided on one side of the negative electrode current collector 110. A tab 522 extends from the edge on one side of the negative electrode current collector 110. The negative electrode film layer 120 is divided into a first region 121 and second regions 122 located on both sides of the first region 121 in the extension direction of the tab 522.

Figure 7:
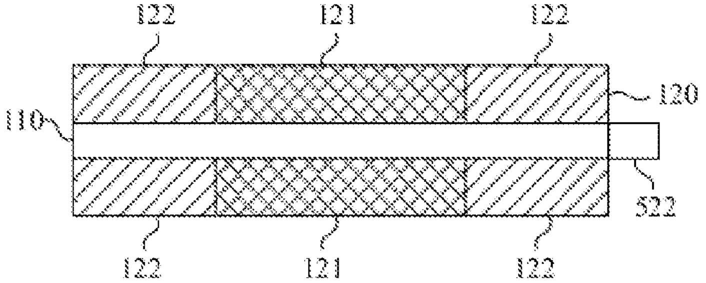
FIG. 7 is a schematic cross-section diagram of another embodiment of a negative electrode plate of the present application.

FIG. 7 schematically shows a sectional view of a negative electrode plate as another example. The negative electrode plate comprises a negative electrode current collector 110 and negative electrode film layers 120 respectively provided on both sides of the negative electrode current collector 110. A tab 522 extends from the edge on one side of the negative electrode current collector 110. Each of the negative electrode film layers 120 is divided into a first region 121 and second regions 122 located on both sides of the first region 121 in the extension direction of the tab 522.

In the negative electrode plate, the tab 522 may be connected by welding to the negative electrode current collector 110, or a blank area (namely, an area not covered by the negative electrode film layer 120) may be reserved in the negative electrode current collector 110 and cut to form the tab 522.

Notably, the parameters of the negative electrode film layer (e.g., the size, compacted density, surface density and the like in different regions of the negative electrode film layer) given in the present application each refer to a parameter range of the film layer on a single side. When the negative electrode film layers are provided on both sides of the negative electrode film layer, the parameters of the film layer on either side satisfying the present application are deemed to fall within the scope of protection of the present application. The ranges of the size, compacted density, surface density and the like in different regions of the negative electrode film layer mentioned in the present application each refer to the parameters of the film layer obtained after compaction by cold pressing and used in battery assembly.

In the secondary battery of the present application, other additional functional layers except the negative electrode film layer are not excluded in the negative electrode plate. For example, in some embodiments, the negative electrode film layer of the present application may also comprise a conductive primer (e.g., consisting of a conductive agent and a binder) provided between the negative electrode current collector and the negative electrode film layer. In some other embodiments, the negative electrode plate of the present application also comprises a protective cover layer covering the surface of the negative electrode film layer.

According to some embodiments, both the direct-current impedance $R_1$ of the part of the negative electrode plate corresponding to the first region and the direct-current impedance $R_2$ of the part of the negative electrode plate corresponding to the second regions are a direct-current impedance normalized with a unit Ah capacity, in mΩ·Ah. An exemplary measurement method is as follows: Round plates with the same area are cut from the first region and the second regions of the negative electrode plate respectively (for a double-side coated negative electrode plate, the negative electrode film layer on one side of the negative electrode current collector is scraped off to retain the negative electrode film layer on the other side only), and then the round plates are respectively assembled with a metal lithium counter electrode to obtain a lithium-ion battery. The formula of an electrolyte solution corresponding to the lithium-ion battery is designed as follows: a non-aqueous organic solvent is formed by ethylene carbonate, ethyl methyl carbonate, dimethyl carbonate and propylene carbonate in a ratio of 20:40:30:10, and the concentration of the lithium salt $LiPF_6$ is 1 mol/L. The assembled lithium-ion battery is placed on an impedance meter (e.g., CT2001D) to measure the direct-current impedance values of the first region and the second regions respectively, and a method for measuring the direct-current impedance value is as follows: the lithium-ion battery is charged with a constant current at a current of 0.1 C to an upper limit voltage $V_0$ of the battery, and then charged with a constant voltage to 0.01 C. The battery is discharged for 30 min with a current at 1 C to make the battery in a state of 50% SOC, then the battery is allowed to stand for 60 min, and the voltage $V_1$ is recorded. The battery is discharged for 30 s with a current at 1 C, and the voltage $V_2$ is recorded. The direct-current impedance is calculated according to a formula: $R=(V_1-V_2)/(1\ C)$.

The upper limit voltage $V_0$ is the upper limit value of the voltage used by a battery product. For example, the upper limit voltage $V_0$ of the lithium iron phosphate ($LiFePO_4$, LFP) system-based battery products is generally 3.65 V; the upper limit voltage $V_0$ of the $LiNi_{0.8}Co_{0.1}Mn_{0.1}O_2$ (NCM811) system-based battery products is generally 4.2 V; and the upper limit voltage $V_0$ of the $LiNi_{0.5}Co_{0.2}Mn_{0.3}O_2$ (NCM523) system-based battery products is generally 4.3V. Charge-discharge rate C=Charge-discharge current (in A)/Rated capacity (in Ah). 1 C means that the rated capacity of the battery is completely discharged over 1 h.

According to some embodiments, the dimension of the first region of the negative electrode film layer in the extension direction of the tab and the dimension of the second regions in the extension direction of the tab have the meanings well-known in the art, and can be determined using methods known in the art. An exemplary measurement method is as follows: a complete negative electrode plate in the extension direction of the tab is taken, and a strip plate with a width of 10±2 mm is cut with a pair of ceramic scissors along a direction parallel to the extension direction of the tab (marked as a direction Q); the plate is cut at an equal spacing of 10 mm along a direction perpendicular to the direction Q, and sample 1, sample 2, . . . are marked along a fixed direction; and the cross section of each sample in the direction Q is polished with an ion beam polisher (e.g., IB-19500CP), and the polished cross section of each sample is imaged with an analytical scanning electron microscope (e.g., ZEISS Sigma 300). Interfaces between the first region and the second regions can be distinguished according to the difference in morphology and porosity between the negative electrode particles in the first region and the second regions, so as to determine the dimensions of the first region and the second regions in the extension direction of the tab.

According to some embodiments, the powder compacted density of the negative electrode active material under a pressure of 25 kN has the meaning well-known in the art, and can be determined with a method known in the art. For example, the measurement can be carried out with reference to the standard GB/T24533-2009 using an electronic pressure testing machine (e.g., model UTM7305). An exemplary measurement method is as follows: 1 g of a negative electrode active material is weighted and added to a mold with a bottom area of 1.327 $cm^2$, and pressurized to 25 kN; the pressure is held for 30 s, and then the pressure relief is performed and held for 10 s; and the powder compacted density of the negative electrode active material under a pressure of 25 kN is calculated and recorded.

According to some embodiments, the OI value of the negative electrode plate=$C_{004}/C_{110}$, where $C_{004}$ is the peak area of a diffraction peak of a crystal plane 004 of a graphite material in the negative electrode plate, and $C_{110}$ is the peak area of a diffraction peak of a crystal plane 110 of a graphite material in the negative electrode plate. The peak area of the diffraction peak can be obtained by measuring the X-ray diffraction pattern.

In the measurement of the OI value of the negative electrode plate, X-ray diffraction analysis can be carried out with reference to the standard JISK 0131-1996 using an X-ray diffractometer. An exemplary measurement method is as follows: a test sample is respectively cut from a part of the negative electrode plate corresponding to the first region of the negative electrode film layer and a part corresponding to the second regions of the negative electrode film layer; the plate samples are respectively placed in the X-ray diffractometer (e.g., Bruker D8 Discover), to obtain X-ray diffraction patterns; and the OI values of the plate samples are obtained according to the $C_{004}/C_{110}$ ratio in the X-ray diffraction patterns. The conditions of the X-ray diffraction analysis are, for example, a copper target as an anode target, CuKα rays as a radiation source, a ray wavelength λ=1.5418 Å, a scanning 2θ angle at 20° to 80°, and a scanning rate at 4°/min.

According to some embodiments, the volume-average particle size $D_v50$ of the negative electrode active material has the meaning well-known in the art, and can be determined with a method known in the art. For example, laser diffraction particle size analysis may be used. The laser diffraction particle size analysis can be performed with a laser particle size analyzer (e.g., Malvern Mastersize 3000). The measurement can be carried out by referring to the standard GB/T 19077-2016. Herein, $D_v50$ is a particle size corresponding to a cumulative volume distribution percentage of the negative electrode active material reaching 50%.

According to some embodiments, the number proportion of the primary particles or secondary particles in the negative electrode active material can be determined with a method known in the art, for example, a scanning electron microscope. An exemplary measurement method is as follows: a negative electrode active material is spread and adhered to a conductive adhesive, to make a test sample with a length of 6 cm and a width of 1.1 cm; and the particle morphology is measured with a scanning electron microscope (e.g., ZEISS Sigma 300). The measurement can be carried out by referring to JY/T010-1996. In order to ensure the accuracy of the measurement result, a plurality of (e.g., 5) different regions may be randomly selected in the test sample for scanning measurement, and under a certain magnification (e.g., 1,000), the number percentage of the secondary particles based on the total number of particles in each region is calculated, which is the number proportion of the secondary particles in this region. An average of the measurement results in the plurality of measurement regions is taken as a measurement result. In order to ensure the accuracy of the test results, the above measurement can be repeated using a plurality of (for example, 10) test samples, and an average of these test samples is taken as the final measurement result. Similarly, the number proportion of the primary particles in the negative electrode active material can be measured.

According to some embodiments, the tap density of the negative electrode active material has the meaning well-known in the art, and can be measured with a method known in the art. For example, the measurement can be carried out with reference to the standard GB/T 5162-2006 using a powder tap density tester. For example, the FZS4-4B type tap density meter of Beijing Iron and Steel Research Institute is used, and the test parameters are as follows: vibration frequency: 250±15 times/min, amplitude: 3±0.2 mm, vibration number: 5000 times, graduated cylinder: 25 mL.

According to some embodiments, the gram capacity of the negative electrode active material has the meaning well-known in the art, and can be measured with a method known in the art. An exemplary measurement method is as follows: a negative electrode active material, a conductive agent carbon black (Super P) and a binder polyvinylidene fluoride (PVDF) in a mass ratio of 91.6:1.8:6.6 are uniformly mixed with a solvent N-methyl pyrrolidone (NMP), to obtain a slurry; and the prepared slurry is applied to a copper foil current collector, and dried in an oven for later use. A metal lithium plate is used as a counter electrode, and a polyethylene (PE) film is used as a separator. Ethylene carbonate (EC), ethyl methyl carbonate (EMC) and diethyl carbonate (DEC) are mixed at a volume ratio of 1:1:1, and then $LiPF_6$ is uniformly dissolved in the above solution to obtain an electrolyte solution, where the concentration of $LiPF_6$ is 1 mol/L. The above components are assembled into a CR2430-type button cell in an argon-protected glove box. The obtained button cell is allowed to stand for 12 h, then discharged to 0.005 V with a constant current at 0.05 C at 25° C., allowed to stand for 10 min, then discharged to 0.005 V with a constant current at a current of 50 μA, allowed to stand for 10 min, and then discharged to 0.005 V with a constant current at 10 μA; and the button cell is charged to 2 V with a constant current at 0.1 C, and the charge capacity is recorded. A ratio of the charge capacity to the mass of the negative electrode active material is the gram capacity of the negative electrode active material.

Notably, the above measurements of the parameters of the negative electrode active material may be performed by directly taking the samples of the negative electrode active material, or by sampling from the secondary battery. When the above test samples are taken from the secondary battery, as an example, the sampling can be carried out by the following steps:

(1) The secondary battery is discharged (for safety, the battery is generally in a full-discharge state); the battery is disassembled, and the negative electrode plate is taken out and soaked in dimethyl carbonate (DMC) for a period (e.g., 2 h to 10 h); and then the negative electrode plate is taken out and dried at a certain temperature for a certain period (e.g., 60° C., 4 h), and then, the dried negative electrode plate is taken out.

(2) The negative electrode plate dried in the step (1) is baked at a certain temperature for a certain period (e.g., 400° C., 2 h), and the negative electrode active material is sampled in a part of the baked negative electrode plate corresponding to the first region and a part corresponding to the second regions respectively (a blade may be used to scrape powder for sampling).

(3) The negative electrode active materials collected in the step (2) are sieved respectively (e.g., with a 200-mesh sieve), to obtain negative electrode active material samples that can be used for measuring the above material parameters of the present application.

In the present application, the surface density and compacted density of the negative electrode film layer can be measured with methods known in the art. For example, a single-side coated negative electrode plate after cold pressing (for a double-side coated negative electrode plate, the negative electrode film layer on one side can be wiped off) is punched into a square plate with an area of S1 (exclusive of the tab) along a direction parallel to the extension direction of the tab, the square plate is weighed, and the weight is marked as M1. Then the negative electrode film layer of the weighed negative electrode plate is wiped off, and the negative electrode current collector is weighed, and the weight is marked as M0. Surface density of negative electrode film layer=(M1−M0)/S1. Compacted density of negative electrode film layer=Surface density of negative electrode film layer/Thickness of negative electrode film layer.

[Positive Electrode Plate]

The secondary battery of the present application may be a positive electrode plate known in the art. In some embodiments, the positive electrode plate comprises a positive electrode current collector and a positive electrode film layer provided on at least one surface of the positive electrode current collector and comprising a positive electrode active material.

The positive electrode active material is not limited in the present application. In some embodiments, the positive electrode active material comprises one or more of lithium transition metal oxides (e.g., lithium-nickel oxides, lithium-nickel-cobalt oxides, lithium-nickel-cobalt-manganese oxides, lithium-nickel-cobalt-aluminum oxides, etc.), lithium-containing phosphates with an olivine structure, and respective modified compounds thereof. As an example, the positive electrode active material comprises one or more of the lithium transition metal oxides shown by a formula 1 and modified compounds thereof.

$$Li_aNi_bCo_cM_dO_eA_f \quad \text{formula 1,}$$

in the formula 1, $0.8 \leq a \leq 1.2$, $0.5 \leq b < 1$, $0 < c < 1$, $0 < d < 1$, $1 \leq e \leq 2$, and $0 \leq f \leq 1$, M is selected from one or more of Mn, Al, Zr, Zn, Cu, Cr, Mg, Fe, V, Ti and B, and A is selected from one or more of N, F, S and Cl.

In addition to the positive electrode active material, the positive electrode film layer usually further optionally comprises a binder and/or a conductive agent. Examples of the conductive agent may include one or more of superconducting carbon, carbon black (e.g., acetylene black, Ketjen black), carbon dots, carbon nanotubes, graphene, and carbon nanofibers. Examples of the binder may include one or more of polyvinylidene fluoride (PVDF), polytetrafluoroethylene (PTFE), polyacrylic acid (PAA), polyvinyl alcohol (PVA), sodium alginate (SA), polymethacrylic acid (PMAA) and carboxymethyl chitosan (CMCS).

The positive electrode current collector may be a metal foil or a composite current collector (a composite current collector can be formed by providing a metal material on a polymer substrate). As an example, the positive electrode current collector may be an aluminum foil.

[Electrode Assembly]

A positive electrode tab extends from the edge on one side of the positive electrode plate. A negative electrode tab extends from the edge on one side of the negative electrode plate. The positive electrode tab may be connected by welding to the positive electrode current collector, or a blank area (namely, an area not covered by the positive electrode film layer) may be reserved in the positive electrode current collector and cut to form the positive electrode tab. The negative electrode tab is connected to the negative electrode plate in a similar manner. A main body part is formed by the above positive electrode plate, negative electrode plate and separator through a lamination process or a winding process, and two tabs (namely, the positive electrode tab and the negative electrode tab) extend from the main body part. In the electrode assembly, the two tabs may extend from the same side of the main body part, or may extend from two opposite sides of the main body part.

In some embodiments, the maximum dimension (height for short) of the main body part in the extension direction of the tab is ≥60 mm, optionally 70 mm to 300 mm, and further optionally 70 mm to 200 mm, 80 mm to 150 mm, 100 mm to 180 mm, etc. The secondary battery of the present application can have a great height, which is helpful in reducing the weight proportion of the current collector and other mechanical parts in the battery and thus improving the energy density of the battery. Even if the main body part has a longer return path of the electrolyte solution in the height direction, since a negative electrode plate according to the present application is used and the entire negative electrode film layer can have a high lithium-intercalation dynamic performance in a battery cycle process, cycle worsening caused by poor infiltration of the electrolyte solution in the middle region can be effectively alleviated, and the battery is enabled to obtain a long cycle life.

In some embodiments, the maximum dimension (width for short) of the main body part in a direction perpendicularly intersecting with the extension direction of the tab is ≥60 mm, optionally 70 mm to 300 mm, and further optionally 70 mm to 200 mm, 80 mm to 220 mm, 100 mm to 250 mm, or 150 mm to 230 mm, etc. The secondary battery of the present application can have a great width, which is helpful in reducing the weight proportion of the current collector and other mechanical parts in the battery and thus improving the energy density of the battery. Even if the main body part has a longer return path of the electrolyte solution in the width direction, since a negative electrode plate according to the present application is used and each region of the negative electrode film layer can have a high lithium-intercalation dynamic performance in a battery cycle process, the battery is enabled to obtain a long cycle life.

Figure 3:
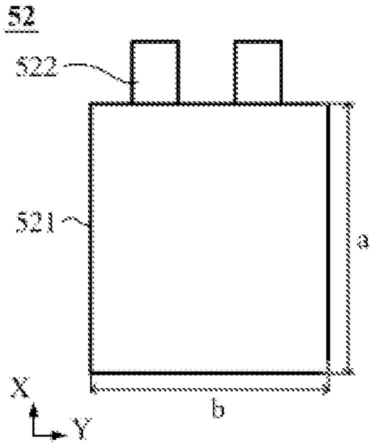
FIG. 3 is a schematic diagram of an embodiment of an electrode assembly of the present application.
Figure 4:
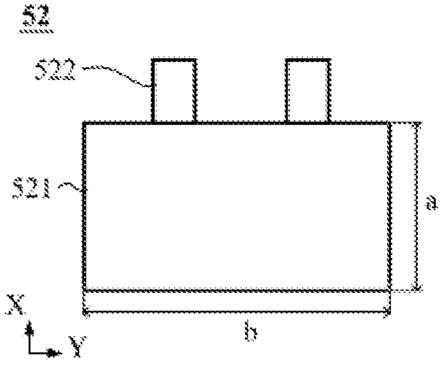
FIG. 4 is a schematic diagram of another embodiment of an electrode assembly of the present application.
Figure 5:
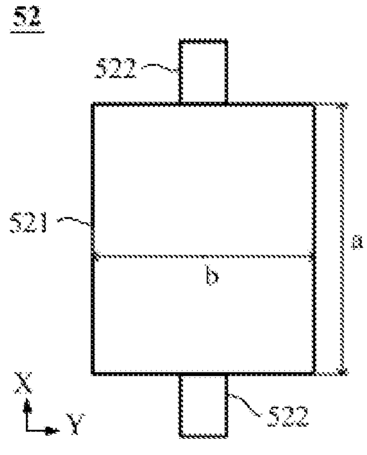
FIG. 5 is a schematic diagram of yet another embodiment of an electrode assembly of the present application.

FIG. 3 and FIG. 4 respectively exemplarily show two different electrode assemblies 52, wherein two tabs 522 extend from the same side of a main body part 521. FIG. 5 exemplarily shows another electrode assembly 52, wherein two tabs 522 extend from two opposite sides of a main body part 521. a is the maximum dimension of the main body part 521 in the extension direction (e.g., direction X in the figure) of the tabs 522. b is the maximum dimension of the main body part 521 in a direction (e.g., direction Y in the figure) perpendicularly intersecting with the extension direction of the tabs 522.

The separator is not particularly limited in the present application, and may be any well-known material. In some embodiments, the separator may be selected from glass fibers, non-woven fabrics, polyethylene films, polypropylene, polyvinylidene fluoride films, and multi-layer composite films thereof.

[Electrolyte Solution]

The electrolyte solution is not specifically limited in the secondary battery of the present application, and may be selected according to actual requirements. The electrolyte solution usually comprises an electrolyte lithium salt and a solvent.

In some embodiments, the electrolyte lithium salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluorooxalate borate (LiDFOB), lithium dioxalate borate (LiBOB), lithium difluorophosphate ($LiPO_2F_2$), lithium bisoxalatodifluorophosphate (LiDFOP) and lithium tetrafluorooxalate phosphate (LiTFOP).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS) and diethyl sulfone (ESE).

In some embodiments, the electrolyte solution also optionally comprises an additive. For example, the additive may include a negative electrode film-forming additive, a positive electrode film-forming additive, and also an additive that can improve certain performance of the battery, such as an additive to improve the overcharge performance of a battery, an additive to improve the high temperature performance of a battery, and an additive to improve the low temperature performance of a battery, etc.

Preparation Method

The present application also provides a method for preparing a secondary battery. The method comprises preparing a negative electrode plate of a secondary battery by the following steps: providing a first negative electrode slurry comprising a first negative electrode active material and a second negative electrode slurry comprising a second negative electrode active material, the first negative electrode active material comprising artificial graphite, and the second negative electrode active material comprising graphite; providing a negative electrode current collector, at least one surface of the negative electrode current collector comprising a first coating area and second coating areas respectively provided on both sides of the first coating area in the extension direction of the tab; and applying the first negative electrode slurry to the first coating area of the negative electrode current collector, and applying the second negative electrode slurry to the second coating areas of the negative electrode current collector, to form a negative electrode film layer, thereby obtaining a negative electrode plate.

The negative electrode slurry is generally formed by dispersing a negative electrode active material, and an optional conductive agent and a binder etc., into a solvent and uniformly stirring same. The solvent may be N-methylpyrrolidone (NMP) or deionized water.

The first negative electrode slurry and the second negative electrode slurry may be applied in twice or simultaneously. The coating is subjected to drying and cold-pressing to form a negative electrode film layer.

Other structures and preparation methods of the secondary battery of the present application are well-known. For example, the positive electrode plate of the present application may be prepared by the following method: a positive electrode active material and an optional conductive agent and binder are mixed and dispersed in a solvent (e.g., NMP), stirred uniformly and then applied to a positive electrode current collector, followed by drying and cold-pressing, to obtain a positive electrode plate.

In some embodiments, the positive electrode plate, the separator and the negative electrode plate are made into an electrode assembly which is placed in an outer package, and an electrolyte solution is injected, followed by procedures such as vacuum packaging, standing, forming and shaping, to obtain a secondary battery.

In the secondary battery of the present application, the outer package may be a hard shell, for example, a hard plastic shell, an aluminum shell, a steel shell or the like. The outer package may also be a soft bag, such as a pouch-type soft bag. The material of the soft bag may plastics, such as one or more of polypropylene (PP), polybutylene terephthalate (PBT), polybutylene succinate (PBS), etc.

Optional technical features of the secondary battery of the present application also apply to the preparation method of the present application.

The shape of the secondary battery is not particularly limited in the present application, and may be a cylindrical shape, a square shape or any other shape. FIG. 1 shows a square secondary battery 5 as an example.

Figure 2:
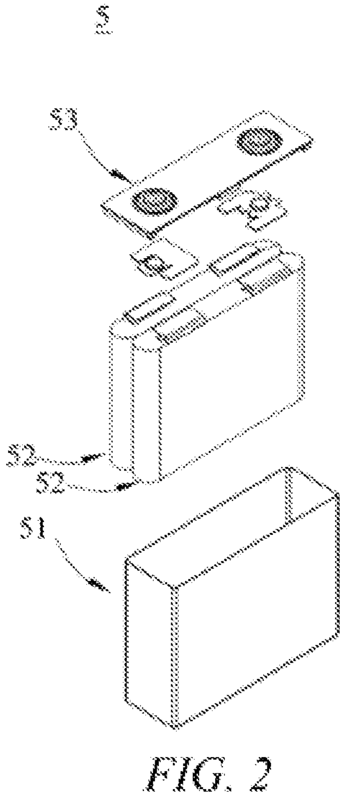
FIG. 2 is an exploded view of FIG. 1.

FIG. 2 is an exploded view of FIG. 1. Referring to FIG. 1 and FIG. 2, a secondary battery 5 comprises an outer package, an electrode assembly 52 and an electrolyte solution (not shown). The outer package may comprise a housing 51 and a top cover assembly 53. The housing 51 has an accommodating cavity and an opening communicated with the accommodating cavity. The electrode assembly 52 is provided in the accommodating cavity. The number of the electrode assembly 52 is not limited, and may be one or more. The electrolyte solution is infiltrated into the electrode assembly 52. The top cover assembly 53 covers the opening to close the accommodating cavity.

The battery module of another aspect of the present application is described below. The battery module comprises a secondary battery of the present application.

Figure 8:
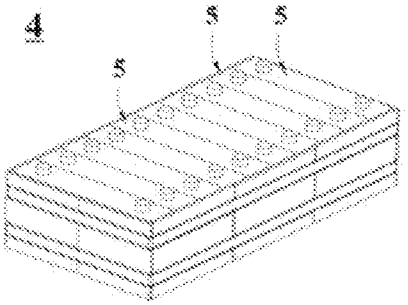
FIG. 8 is a schematic diagram of an embodiment of a battery module of the present application.

FIG. 8 is a perspective view of a battery module 4 as an example. Referring to FIG. 4, the battery module 4 comprises a plurality of secondary batteries 5. The plurality of secondary batteries 5 are arranged in a longitudinal direction. The battery module 4 may serve as a power source or an energy storage device. The number of lithium-ion batteries 5 included in the battery module 4 can be adjusted according to the present application and capacity of the battery module 4.

The battery pack of yet another aspect of the present application is described below. The battery pack comprises a secondary battery and/or a battery module of the present application.

Figure 9:
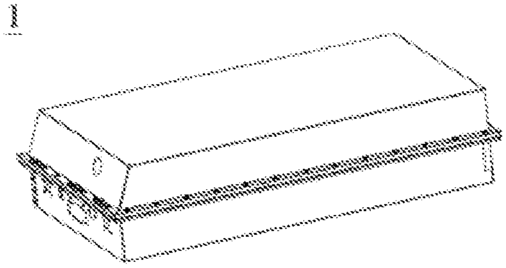
FIG. 9 is a schematic diagram of an embodiment of a battery pack of the present application.
Figure 10:
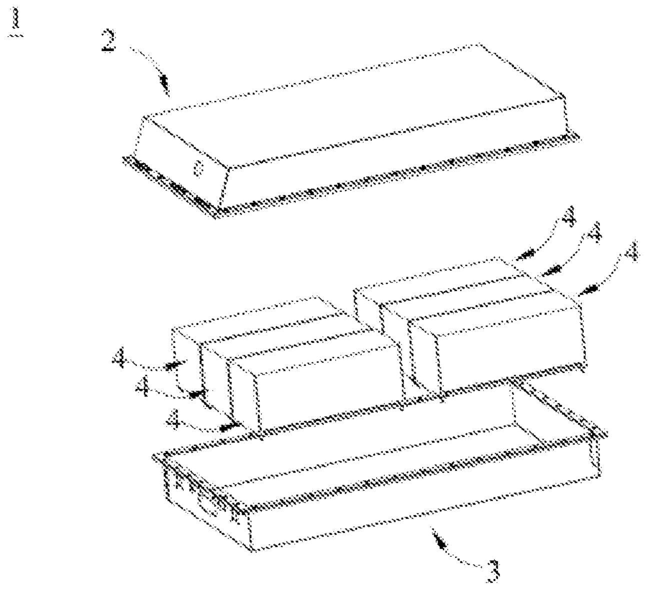
FIG. 10 is an exploded view of FIG. 9.
Figure 11:
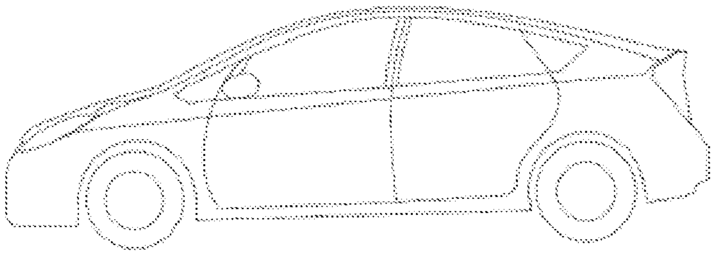
FIG. 11 is a schematic diagram of an embodiment of a device with a secondary battery as a power source.

FIG. 9 and FIG. 10 show a battery pack 1 as an example. Referring to FIG. 9 and FIG. 10, the battery pack 1 comprises a battery box and a plurality of battery modules 4 provided in the battery box. The battery box comprises an upper box body 2 and a lower box body 3. The upper box body 2 and the lower box body 3 are assembled together to form a space for accommodating the battery modules 4. The number and arrangement manner of the battery modules 4 used in the battery pack 1 can be determined according to actual requirements.

The device of yet another aspect of the present application is described below. The device comprises at least one of a secondary battery, a battery module or a battery pack of the present application. The secondary battery, the battery module or the battery pack may be used as a power source or an energy storage unit of the device. The device may be, but is not limited to, a mobile device (e.g., a mobile phone, a laptop computer, etc.), an electric vehicle (e.g., an electric vehicle, an electric bus, an electric tram, an electric bicycle, an electric motorcycle, an electric scooter, an electric golf cart, or an electric truck), an electric train, a ship, and a satellite, an energy storage system, etc. The device can incorporate the secondary battery, battery module or battery pack according to its usage requirements.

FIG. 10 shows a device as an example. The device is an electric vehicle. The electric vehicle may be a pure electric vehicle, a hybrid electric vehicle or a plug-in hybrid electric vehicle, etc. Of course, the electric vehicle may comprise a battery module 4 or a battery pack 1 of the present application according to the actual usage form.

EXAMPLES

The following examples more specifically describe the content disclosed in the present application, and these examples are only used for explanatory description, because various modifications and changes within the scope of the present disclosure are obvious to those skilled in the art. Unless otherwise noted, all parts, percentages and ratios reported in the following examples are on a weight basis, and all reagents used in the examples are commercially available or are synthesized according to conventional methods, and can be used directly without further treatment, and the instruments used in the examples are commercially available.

I. Negative Electrode Active Material

Artificial graphite A: it is commercially available from a supplier of negative electrode materials. The artificial graphite A is primary particles, with a gram capacity of 340 mAh/g to 353 mAh/g, with the rest physical property parameters listed in Table 1 and Table 2.

Artificial graphite B: it is commercially available from a supplier of negative electrode materials. The artificial graphite B is secondary particles, with a gram capacity of 353 mAh/g to 360 mAh/g, the rest physical property parameters listed in Table 1 and Table 2.

Natural graphite: it is commercially available from a supplier of negative electrode materials. The physical property parameters of the natural graphite are as follows: a gram capacity of 365 mAh/g, $D_v50=16$ μm, and a powder compacted density under 25 kN of 1.85 g/cm$^3$.

II. Preparation of Battery

Example 1

Preparation of Negative Electrode Plate

A first negative electrode active material artificial graphite A, a conductive agent Super P, a binder SR-1B and a thickening agent CMC-Na in a mass ratio of 96:1.5:1.5:1 were sufficiently stirred and mixed in a proper amount of deionized water, to form a uniform first negative electrode slurry. The $D_v50$ of the first negative electrode active material was 6.2 μm.

A second negative electrode active material artificial graphite B, a conductive agent Super P, a binder SBR and a thickening agent CMC-Na in a mass ratio of 96:1.5:1.5:1 were sufficiently stirred and mixed in deionized water, to form a uniform second negative electrode slurry. The $D_v50$ of the second negative electrode active material was 16.3 μm.

A copper foil was used as a negative electrode current collector, and its surface was divided into a coating area and a blank area adjacent to the coating area in the extension direction of the tab, and the coating area was divided into a first coating area and second coating areas respectively provided on both sides of the first coating area in the extension direction of the tab. The first negative electrode slurry was applied to the first coating area of the negative electrode current collector, and the second negative electrode slurry was applied to the second coating areas of the negative electrode current collector, to form a negative electrode coating. The negative electrode coating was subjected to drying and cold pressing to form a negative electrode film layer. The blank area of the negative electrode current collector was cut to form a negative electrode tab. A negative electrode plate was obtained.

In the negative electrode plate, the dimension of the negative electrode film layer in the extension direction of the tab was 90 mm. The negative electrode film layer comprised a first region and second regions provided on both sides of the first region in the extension direction of the tab, and the two second regions provided on both sides of the first region had the same dimension in the extension direction of the tab. When the dimension of the first region in the extension direction of the tab was marked as $L_1$, and a sum of the dimensions of the two second regions on both sides of the first region in the extension direction of the tab was marked as $L_2$, then: $L_1/L_2=1.5$. The negative electrode film layer had a surface density of 9 mg/cm$^2$ and a compacted density was 1.55 g/cm$^3$.

Preparation of Positive Electrode Plate

A lithium-nickel-cobalt-manganese oxide $LiNi_{0.5}Co_{0.2}Mn_{0.3}O_2$ (NCM523), a conductive agent Super P and a binder PVDF in a mass ratio of 96:2:2 were sufficiently stirred and uniformly mixed in an appropriate amount of NMP, to form a uniform positive electrode slurry. The positive electrode slurry was applied to the surface of an aluminum foil of a positive electrode current collector, followed by drying and cold pressing, to obtain a positive electrode plate. The positive electrode film layer had a surface density of 15.4 mg/cm$^2$ and a compacted density of 3.4 g/cm$^3$.

Separator

A polyethylene (PE) film was used.

Preparation of Electrolyte Solution

Ethylene carbonate (EC), ethyl methyl carbonate (EMC), and diethyl carbonate (DEC) were mixed in a volume ratio of 4:3:3, and a sufficiently dried lithium salt $LiPF_6$ was uniformly dissolved in the foregoing solution to obtain an electrolyte solution, wherein the concentration of $LiPF_6$ was 1 mol/L.

Preparation of Secondary Battery

The positive electrode plate, the separator and the negative electrode plate were laminated in sequence and wound to obtain an electrode assembly; the electrode assembly was placed in an outer package, and the above electrolyte solution was added, followed by procedures such as vacuum packaging, standing, forming and aging, to obtain a secondary battery. The height×width×thickness of the main body part of the electrode assembly was 90 mm×215 mm×31 mm. The tab extended from the main body part in the height direction.

The preparation methods in Examples 2 to 27 and Comparative examples 1 to 3 were similar to the preparation method in Example 1, except that the preparation parameters of the negative electrode plate were adjusted. The details of different preparation parameters and product parameters are shown in Table 1 and Table 2.

III. Test of Battery Performance (1) Test of Fast-Charging Ability

At 25° C., the batteries of all examples and comparative examples were subjected to first charge and discharge with a current at 1 C (namely, the current value of the rated capacity is completely discharged over 1 h), specifically comprising: the battery was charged to a voltage of 4.3 V with a constant current at a 1 C rate, then charged with a constant voltage to a current of ≤0.05 C, allowed to stand for 5 min, and then discharged to a voltage of 2.8 V with a constant current at a 0.33 C rate; and the actual capacity of the battery was recorded as $C_0$.

Then, the battery was charged to a whole-battery charge cut-off voltage of 4.3 V or a negative electrode cut-off potential of 0 V (whichever comes first) with 2.0 $C_0$, 2.5 $C_0$, 3.0 $C_0$, 3.5 $C_0$, 4.0 $C_0$, 4.5 $C_0$, 5.0 $C_0$, 5.5 $C_0$ and a constant current in sequence. After each charge was completed, the battery was discharged with 1 $C_0$ to a whole-battery discharge cut-off voltage of 2.8 V, corresponding negative electrode potentials were recorded when the battery was charged to 10%, 20%, 30%, . . . , 80% SOC (State of Charge) at different charge rates, charge rate – negative electrode potential curves in different SOC states were drawn, and linear fitting was performed to obtain corresponding charge rates when the negative electrode potential was 0 V in different SOC states, where the charge rates were charging windows in the SOC states, marked as C20% SOC, C30% SOC, C40% SOC, C50% SOC, C60% SOC, C70% SOC and C80% SOC respectively; and a charging time T, in min, for charging the battery from 10% SOC to 80% SOC was calculated according to a formula (60/C20% SOC+60/C30% SOC+60/C40% SOC+60/C50% SOC+60/C60% SOC+60/C70% SOC+60/C80% SOC)×10%. The shorter the time, the better the fast-charging performance of the battery.

(2) Test of Cycle Performance

At 25° C., the secondary batteries prepared in the examples and comparative examples were charged to 4.3 V with a constant current at a 1 C rate, then charged with a constant voltage to a current of ≤0.05 C, allowed to stand for 5 min, then discharged to 2.8 V with a constant current at a 1 C rate, and allowed to stand for 5 min, to form a charge-discharge cycle; and the first-round discharge capacity was recorded. The battery was repeatedly charged and discharged following this method until the battery capacity was attenuated to 80% of the first-round discharge capacity. The number of cycle rounds at this moment was the cycle life of the battery at 25° C. The more the cycle rounds, the longer the cycle life of the battery.

The test results of the battery performance are shown in Table 3.

TABLE 1

| | Preparation parameters of negative electrode plate | | | | | | | |
|---|---|---|---|---|---|---|---|---|
| | First region | | | | Second region | | | |
| Serial No. | Type of the first negative electrode active material | Powder compacted density $D_1$ of the first negative electrode active material under a pressure of 25 kN g/cm$^3$ | OI value $V_1$ of the part of the negative electrode plate corresponding to the first region | $D_v50$ of the first negative electrode active material μm | Type of the second negative electrode active material | Powder compacted density $D_2$ of the second negative electrode active material under a pressure of 25 kN g/cm$^3$ | OI value $V_2$ of the part of the negative electrode plate corresponding to the second region | $D_v50$ of the second negative electrode active material μm |
| Example 1 | Artificial graphite A | 1.11 | 20.5 | 6.2 | Artificial graphite B | 1.85 | 37 | 16.3 |
| Example 2 | Artificial graphite A | 1.30 | 22.0 | 7.0 | Artificial graphite B | 1.85 | 37 | 16.3 |
| Example 3 | Artificial graphite A | 1.48 | 24.0 | 9.8 | Artificial graphite B | 1.85 | 37 | 16.3 |
| Example 4 | Artificial graphite A | 1.67 | 27.5 | 10.5 | Artificial graphite B | 1.85 | 37 | 16.3 |
| Example 5 | Artificial graphite A | 1.76 | 30.0 | 11.7 | Artificial graphite B | 1.85 | 37 | 16.3 |
| Example 6 | Artificial graphite A | 1.52 | 24.0 | 9.8 | Artificial graphite B | 1.9 | 39 | 17.0 |
| Example 7 | Artificial graphite A | 1.52 | 24.0 | 9.8 | Artificial graphite B | 1.85 | 37 | 16.3 |
| Example 8 | Artificial graphite A | 1.52 | 24.0 | 9.8 | Artificial graphite B | 1.78 | 32 | 14.0 |
| Example 9 | Artificial graphite A | 1.52 | 24.0 | 9.8 | Artificial graphite B | 1.72 | 29 | 12.0 |
| Example 10 | Artificial graphite A | 1.52 | 24.0 | 9.8 | Artificial graphite B | 1.66 | 27 | 11.0 |
| Example 11 | Artificial graphite A | 1.55 | 24.0 | 9.8 | Artificial graphite B | 1.8 | 33 | 15.7 |
| Example 12 | Artificial graphite A | 1.55 | 24.0 | 9.8 | Artificial graphite B | 1.8 | 33 | 15.7 |
| Example 13 | Artificial graphite A | 1.55 | 24.0 | 9.8 | Artificial graphite B | 1.8 | 33 | 15.7 |
| Example 14 | Artificial graphite A | 1.55 | 24.0 | 9.8 | Artificial graphite B | 1.8 | 33 | 15.7 |
| Example 15 | Artificial graphite A | 1.55 | 24.0 | 9.8 | Artificial graphite B | 1.8 | 33 | 15.7 |
| Example 16 | Artificial graphite A | 1.55 | 24.0 | 9.8 | Artificial graphite B | 1.8 | 33 | 15.7 |
| Example 17 | Artificial graphite A | 1.55 | 24.0 | 9.8 | Artificial graphite B | 1.8 | 33 | 15.7 |
| Example 18 | Artificial graphite A | 1.55 | 24.0 | 9.8 | Artificial graphite B | 1.8 | 33 | 15.7 |
| Example 19 | Artificial graphite A | 1.55 | 24.0 | 9.8 | Artificial graphite B | 1.8 | 33 | 15.7 |

TABLE 2

| Preparation parameters of negative electrode plate | | | | | | | | |
|---|---|---|---|---|---|---|---|---|
| | First region | | | | Second region | | | |
| Serial No. | Type of the first negative electrode active material | Powder compacted density $D_1$ of the first negative electrode active material under a pressure of 25 kN g/cm$^3$ | OI value $V_1$ of the part of the negative electrode plate corresponding to the first region | $D_v50$ of the first negative electrode active material μm | Type of the second negative electrode active material | Powder compacted density $D_2$ of the second negative electrode active material under a pressure of 25 kN g/cm$^3$ | OI value $V_2$ of the part of the negative electrode plate corresponding to the second region | $D_v50$ of the second negative electrode active material μm |
| Example 20 | Artificial graphite A | 1.20 | 10.0 | 6.0 | Artificial graphite B | 1.85 | 40 | 15.6 |
| Example 21 | Artificial graphite A | 1.40 | 16.0 | 8.0 | Artificial graphite B | 1.85 | 40 | 15.6 |
| Example 22 | Artificial graphite A | 1.56 | 20.0 | 10.5 | Artificial graphite B | 1.85 | 40 | 15.6 |
| Example 23 | Artificial graphite A | 1.64 | 28.0 | 11.7 | Artificial graphite B | 1.85 | 40 | 15.6 |
| Example 24 | Artificial graphite A | 1.70 | 36.0 | 13.7 | Artificial graphite B | 1.85 | 40 | 15.6 |
| Example 25 | Artificial graphite A | 1.82 | 38.0 | 15.8 | Artificial graphite B | 1.85 | 40 | 15.6 |
| Example 26 | Artificial graphite A | 1.55 | 24.0 | 9.8 | Artificial graphite B + natural graphite | 1.85 | 44 | 15.8 |
| Example 27 | Artificial graphite A + natural graphite | 1.62 | 28.0 | 11.3 | Artificial graphite B + natural graphite | 1.85 | 44 | 15.8 |
| Comparative Example 1 | Artificial graphite B | 1.8 | 33.0 | 15.7 | Artificial graphite B | 1.8 | 33 | 15.7 |
| Comparative example 2 | Artificial graphite A | 1.7 | 36.0 | 13.7 | Artificial graphite A | 1.7 | 36.0 | 13.7 |
| Comparative example 3 | Artificial graphite A | 1.8 | 33.0 | 15.7 | Artificial graphite B | 1.55 | 24 | 9.8 |

In Table 2, in the mixed graphite of artificial graphite A+ natural graphite used in Example 26, a mass ratio of the artificial graphite A to the natural graphite is 8:2; wherein the $D_v50$ of the artificial graphite A=9.8 μm, and the powder compacted density under 25 kN is 1.55 g/cm$^3$; and in the mixed graphite of artificial graphite B+ natural graphite used in Examples 26 and 27, a mass ratio of the artificial graphite B to the natural graphite is 8:2; wherein the $D_v50$ of the artificial graphite B=15.7 in, and the powder compacted density under 25 kN is 1.8 g/cm$^3$.

TABLE 3

| Test results of characteristic parameters of negative electrode plate and performance of secondary battery | | | | | | | | | |
|---|---|---|---|---|---|---|---|---|---|
| Serial No. | $L_1/L_2$ | $D_1/D_2$ | $V_1/V_2$ | $R_1$ mΩ × Ah | $R_2$ mΩ × Ah | $R_1/R_2$ | First-round discharge capacity mAh/g | Fast-charging minutes (min) | Cycle performance (round) |
| Example 1 | 1.5 | 0.60 | 0.55 | 27 | 38 | 0.71 | 349.0 | 9.2 | 1750 |
| Example 2 | 1.5 | 0.70 | 0.59 | 28 | 38 | 0.74 | 350.3 | 10.5 | 1790 |
| Example 3 | 1.5 | 0.80 | 0.65 | 30 | 38 | 0.79 | 351.0 | 11.6 | 1830 |
| Example 4 | 1.5 | 0.90 | 0.74 | 32 | 38 | 0.84 | 352.6 | 12.4 | 1760 |
| Example 5 | 1.5 | 0.95 | 0.81 | 34 | 38 | 0.89 | 354.0 | 13.5 | 1680 |
| Example 6 | 1.5 | 0.80 | 0.62 | 30 | 40 | 0.75 | 354.0 | 13.5 | 1750 |
| Example 7 | 1.5 | 0.82 | 0.65 | 30 | 38 | 0.79 | 353.5 | 12.4 | 1830 |
| Example 8 | 1.5 | 0.85 | 0.75 | 30 | 35.3 | 0.85 | 352.8 | 11.6 | 1830 |
| Example 9 | 1.5 | 0.88 | 0.83 | 30 | 33.3 | 0.90 | 351.0 | 11.0 | 1760 |
| Example 10 | 1.5 | 0.92 | 0.89 | 30 | 31.6 | 0.95 | 350.0 | 10.5 | 1650 |
| Example 11 | 9.0 | 0.86 | 0.73 | 30 | 36 | 0.83 | 350.3 | 9.2 | 1680 |
| Example 12 | 4.0 | 0.86 | 0.73 | 30 | 36 | 0.83 | 350.6 | 9.4 | 1720 |
| Example 13 | 2.3 | 0.86 | 0.73 | 30 | 36 | 0.83 | 350.9 | 9.7 | 1810 |
| Example 14 | 1.5 | 0.86 | 0.73 | 30 | 36 | 0.83 | 351.2 | 10.0 | 1830 |
| Example 15 | 1.0 | 0.86 | 0.73 | 30 | 36 | 0.83 | 351.5 | 10.3 | 1775 |
| Example 16 | 0.7 | 0.86 | 0.73 | 30 | 36 | 0.83 | 351.8 | 10.9 | 1705 |
| Example 17 | 0.4 | 0.86 | 0.73 | 30 | 36 | 0.83 | 352.1 | 11.6 | 1652 |
| Example 18 | 0.3 | 0.86 | 0.73 | 30 | 36 | 0.83 | 352.4 | 12.1 | 1615 |
| Example 19 | 0.1 | 0.86 | 0.73 | 30 | 36 | 0.83 | 352.7 | 12.6 | 1563 |
| Example 20 | 1.5 | 0.65 | 0.25 | 26 | 39 | 0.67 | 347.0 | 9.0 | 1740 |

TABLE 3-continued

Test results of characteristic parameters of negative electrode plate and performance of secondary battery

| Serial No. | $L_1/L_2$ | $D_1/D_2$ | $V_1/V_2$ | $R_1$ mΩ × Ah | $R_2$ mΩ × Ah | $R_1/R_2$ | First-round discharge capacity mAh/g | Fast-charging minutes (min) | Cycle performance (round) |
|---|---|---|---|---|---|---|---|---|---|
| Example 21 | 1.5 | 0.76 | 0.4 | 28 | 39 | 0.72 | 349.0 | 9.8 | 1790 |
| Example 22 | 1.5 | 0.84 | 0.5 | 29.5 | 39 | 0.76 | 351.0 | 10.6 | 1840 |
| Example 23 | 1.5 | 0.89 | 0.7 | 31 | 39 | 0.79 | 352.5 | 11.5 | 1850 |
| Example 24 | 1.5 | 0.92 | 0.9 | 34 | 39 | 0.87 | 353.2 | 12.6 | 1780 |
| Example 25 | 1.5 | 0.98 | 0.95 | 37 | 39 | 0.95 | 354.0 | 13.8 | 1620 |
| Example 26 | 1.5 | 0.84 | 0.55 | 30 | 42 | 0.71 | 352.5 | 10.5 | 1800 |
| Example 27 | 1.5 | 0.88 | 0.64 | 32 | 42 | 0.76 | 353.4 | 11.5 | 1750 |
| Comparative Example 1 | / | / | / | 36 | 36 | 1 | 354.0 | 13.1 | 1510 |
| Comparative example 2 | / | / | / | 34 | 34 | 1 | 350 | 11.5 | 1550 |
| Comparative example 3 | 1.5 | 1.16 | 1.38 | 36 | 30 | 1.2 | 351.2 | 12.6 | 1350 |

It can be seen from the data in the table that, in the secondary batteries of the examples of the present application, when artificial graphite is used in a middle region of the negative electrode film layer in the extension direction of the tab and graphite is used on both side regions, and the direct-current impedance of the part of the negative electrode plate corresponding to the first region is less than that of the part corresponding to the second regions, the secondary battery is enabled to have a high energy density as well as a long cycle life and a high fast-charging ability.

Since the Comparative examples 1 to 3 do not satisfy the above conditions, it is difficult for the battery to have both a high energy density and a long cycle life.

In addition, the inventors have also found that when the artificial graphite A is secondary particles, the energy density of the secondary battery can be further improved while the secondary battery is enabled to have a long cycle life and a high fast-charging ability. Since the test results are close to the data of Examples 1 to 27 in Table 3, they will not be repeated here.

Described above are merely specific embodiments of the present application, and the scope of protection of the present application is not limited thereto; any equivalent modification or replacement can be readily conceived by a person skilled in the art according to the technical range of the disclosure of the present application, and shall fall within the protection scope of the present application. Therefore, the scope of protection of the present application shall be determined by the claims.

The invention claimed is:

1. A secondary battery, comprising an electrode assembly, the electrode assembly comprising a main body part and a tab extending from the main body part, the main body part comprising a negative electrode plate, and the negative electrode plate comprising a negative electrode current collector and a negative electrode film layer provided on at least one surface of the negative electrode current collector, wherein the negative electrode film layer comprises a first region and second regions provided on both sides of the first region in the extension direction of the tab, the first region comprises a first negative electrode active material, the first negative electrode active material comprising artificial graphite, and each of the second regions comprises a second negative electrode active material, the second negative electrode active material comprising graphite; and when the direct-current impedance of a part of the negative electrode plate corresponding to the first region is marked as $R_1$, and the direct-current impedance of a part of the negative electrode plate corresponding to the second regions is marked as $R_2$, the second battery satisfies that: $R_1<R_2$.

2. The secondary battery according to claim 1, wherein $0.65 \le R_1/R_2 \le 0.95$.

3. The secondary battery according to claim 1, wherein when the dimension of the first region in the extension direction of the tab is marked as $L_1$, and a sum of the dimensions of the two second regions on both sides of the first region in the extension direction of the tab is marked as $L_2$, the secondary battery satisfies that: $L_1 \ge L_2$; optionally, $1 \le L_1/L_2 \le 9$.

4. The secondary battery according to claim 1, wherein the two second regions provided on both sides of the first region have the same dimension in the extension direction of the tab.

5. The secondary battery according to claim 1, wherein a powder compacted density of the first negative electrode active material under a pressure of 25 kN is less than that of the second negative electrode active material under a pressure of 25 kN.

6. The secondary battery according to claim 1, wherein a ratio of a powder compacted density of the first negative electrode active material under a pressure of 25 KN to a powder compacted density of the second negative electrode active material under a pressure of 25 kN is 0.6 to 1.

7. The secondary battery according to claim 1, wherein a powder compacted density of the first negative electrode active material under a pressure of 25 kN is 1.1 g/cm$^3$ to 1.9 g/cm$^3$; and/or a powder compacted density of the second negative electrode active material under a pressure of 25 kN is 1.5 g/cm$^3$ to 2.0 g/cm$^3$.

8. The secondary battery according to claim 1, wherein when the OI value of the part of the negative electrode plate corresponding to the first region is marked as $V_1$, and the OI value of the part of the negative electrode plate corresponding to the second regions is marked as $V_2$, then, $V_1<V_2$.

9. The secondary battery according to claim 8, wherein the $V_1$ and $V_2$ satisfy that: $0.25 \leq V_1/V_2 \leq 0.95$.

10. The secondary battery according to claim 1, wherein the OI value of the part of the negative electrode plate corresponding to the first region is 10 to 40; and/or the OI value of the part of the negative electrode plate corresponding to the second regions is 20 to 50.

11. The secondary battery according to claim 1, wherein the volume-average particle size $D_v50$ of the first negative electrode active material is 6 μm to 18 μm; and/or the volume-average particle size $D_v50$ of the second negative electrode active material is 10 μm to 22 μm.

12. The secondary battery according to claim 1, wherein the number proportion of primary particles in the first negative electrode active material is ≥60%, and the volume-average particle size $D_v50$ of the first negative electrode active material is 9 μm to 12 μm; or, the number proportion of secondary particles in the first negative electrode active material is ≥60%, and the volume-average particle size $D_v50$ of the first negative electrode active material is 12 μm to 15 μm.

13. The secondary battery according to claim 1, wherein the tap density of the first negative electrode active material is 0.85 $g/cm^3$ to 1.3 $g/cm^3$; and/or the tap density of the second negative electrode active material is 0.95 $g/cm^3$ to 1.5 $g/cm^3$.

14. The secondary battery according to claim 1, wherein the second negative electrode active material comprises one or more of artificial graphite and natural graphite.

15. The secondary battery according to claim 1, wherein the first negative electrode active material further comprises natural graphite.

16. The secondary battery according to claim 1, wherein the surface density of the negative electrode film layer is 0.03 $mg/mm^2$ to 0.16 $mg/mm^2$; and/or the compacted density of the negative electrode film layer is 1.2 $g/cm^3$ to 2.0 $g/cm^3$.

17. The secondary battery according to claim 1, wherein the maximum dimension of the main body part in the extension direction of the tab is ≥60 mm; and/or the maximum dimension of the main body part in a direction perpendicularly intersecting with the extension direction of the tab is ≥60 mm.

18. The secondary battery according to claim 1, wherein the main body part comprises a positive electrode plate, the positive electrode plate comprises a positive electrode current collector and a positive electrode film layer provided on at least one surface of the positive electrode current collector and comprising a positive electrode active material, and the positive electrode active material comprises one or more of lithium transition metal oxides, lithium-containing phosphates with an olivine structure and respective modified compounds thereof; optionally, the positive electrode active material comprises one or more of lithium transition metal oxides shown by a formula 1 and modified compounds thereof, $$Li_aNi_bCo_cM_dO_eA_f \quad \text{formula 1,}$$

in which formula 1, $0.8 \leq a \leq 1.2$, $0.5 \leq b < 1$, $0 < c < 1$, $0 < d < 1$, $1 \leq e \leq 2$, and $0 \leq f \leq 1$, M is selected from one or more of Mn, Al, Zr, Zn, Cu, Cr, Mg, Fe, V, Ti and B, and A is selected from one or more of N, F, S and Cl.

19. A battery module, comprising a secondary battery according to claim 1.

20. A method for preparing a secondary battery, the secondary battery comprising an electrode assembly, the electrode assembly comprising a main body part and a tab extending from the main body part, and the main body part comprising a negative electrode plate, wherein the method comprises preparing a negative electrode plate of the secondary battery by the following steps:

providing a first negative electrode slurry comprising a first negative electrode active material and a second negative electrode slurry comprising a second negative electrode active material, the first negative electrode active material comprising artificial graphite, and the second negative electrode active material comprising graphite;

providing a negative electrode current collector, at least one surface of the negative electrode current collector comprising a first coating area and second coating areas respectively provided on both sides of the first coating area in the extension direction of the tab; and applying the first negative electrode slurry to the first coating area of the negative electrode current collector, and applying the second negative electrode slurry to the second coating areas of the negative electrode current collector, to form a negative electrode film layer; and, wherein the negative electrode film layer comprises a first region and second regions provided on both sides of the first region in the extension direction of the tab, the first region comprises the first negative electrode active material, each of the second regions comprises the second negative electrode active material, and when the direct-current impedance of a part of the negative electrode plate corresponding to the first region is marked as $R_1$, and the direct-current impedance of a part of the negative electrode plate corresponding to the second regions is marked as $R_2$, then $R_1 < R_2$.

* * * * *